United States Patent
Kong et al.

(10) Patent No.: US 12,291,076 B2
(45) Date of Patent: May 6, 2025

(54) VEHICLE BODY STRUCTURE CAPABLE OF MODULAR ASSEMBLY

(71) Applicants: Hyundai Motor Company, Seoul (KR); Kia Corporation, Seoul (KR); Inha University Research and Business Foundation, Incheon (KR)

(72) Inventors: Do Hyun Kong, Gwangmyeong-Si (KR); Jeong Hwan Park, Seoul (KR); Chang Seop An, Incheon (KR); Jae Young Kang, Incheon (KR); Dong Woo Seo, Incheon (KR); Hui Seung Yun, Incheon (KR)

(73) Assignees: Hyundai Motor Company, Seoul (KR); Kia Corporation, Seoul (KR); Inha University Research and Business Foundation, Incheon (KR)

( * ) Notice: Subject to any disclaimer, the term of this patent is extended or adjusted under 35 U.S.C. 154(b) by 0 days.

(21) Appl. No.: 18/530,982

(22) Filed: Dec. 6, 2023

(65) Prior Publication Data
US 2024/0375469 A1    Nov. 14, 2024

(30) Foreign Application Priority Data

May 12, 2023    (KR) .......................... 10-2023-0061447

(51) Int. Cl.
*B60G 7/02*    (2006.01)
*B60G 13/00*    (2006.01)

(52) U.S. Cl.
CPC .............. *B60G 7/02* (2013.01); *B60G 13/005* (2013.01); *B60G 2204/41* (2013.01); *B60G 2204/4302* (2013.01); *B60G 2206/7101* (2013.01)

(58) Field of Classification Search
CPC .... B60G 2204/4302; B60G 7/02; B60G 3/20; B60G 7/001
See application file for complete search history.

(56) References Cited

U.S. PATENT DOCUMENTS

| | | | | |
|---|---|---|---|---|
| 2,635,895 A | * | 4/1953 | Nils | B60G 13/003 267/222 |
| 5,538,274 A | * | 7/1996 | Schmitz | B60G 7/02 280/124.135 |
| 6,000,706 A | * | 12/1999 | Boberg | B60G 3/20 280/124.135 |
| 2022/0111692 A1 | * | 4/2022 | Berardi | B60G 3/20 |

(Continued)

FOREIGN PATENT DOCUMENTS

| | | | | |
|---|---|---|---|---|
| CN | 114179583 A | * | 3/2022 | ............... B60G 3/20 |
| CN | 116209586 A | * | 6/2023 | ........... B60G 15/065 |
| EP | 0071250 A2 | * | 2/1983 | |

(Continued)

*Primary Examiner* — Nicole T Verley
(74) *Attorney, Agent, or Firm* — Morgan, Lewis & Bockius LLP

(57) ABSTRACT

A vehicle body structure capable of modular assembly includes a chassis frame extending from a body frame forming a vehicle body. A corner module is fastened to a side portion of the chassis frame. The corner module includes a knuckle fastened to a wheel, an upper arm positioned between a top end portion of the knuckle and a module bracket mounted on the chassis frame, and an elastic member mounted between the module bracket and a bottom end portion of the knuckle.

20 Claims, 6 Drawing Sheets

(56) References Cited

U.S. PATENT DOCUMENTS

| | | | | |
|---|---|---|---|---|
| 2023/0110766 A1* | 4/2023 | Lumini | ................. | B62D 25/16 |
| | | | | 280/5.52 |
| 2024/0100898 A1* | 3/2024 | Chang | .................... | B60G 11/08 |

FOREIGN PATENT DOCUMENTS

| | | | | | |
|---|---|---|---|---|---|
| EP | 0207795 | A2 | * | 1/1987 | |
| EP | 0706904 | B1 | * | 1/2002 | |
| EP | 1190875 | A2 | * | 3/2002 | ........... B60G 13/005 |
| EP | 3363662 | A1 | * | 8/2018 | ............ B60G 11/27 |
| JP | 7056117 | B2 | * | 4/2022 | ............ B60G 11/08 |
| KR | 2007-0103191 | A | | 10/2007 | |
| WO | WO-2017017506 | A1 | * | 2/2017 | ........... B60G 15/067 |
| WO | WO-9108918 | A1 | * | 6/2019 | |
| WO | WO-2019111918 | A1 | * | 6/2019 | ............ B60G 11/08 |
| WO | WO-2019111991 | A1 | * | 6/2019 | ............ B60G 11/08 |

\* cited by examiner

VEHICLE BODY STRUCTURE CAPABLE OF MODULAR ASSEMBLY

CROSS REFERENCE TO RELATED APPLICATION

The present application claims priority to Korean Patent Application No. 10-2023-0061447, filed May 12, 2023, the entire contents of which is incorporated herein for all purposes by this reference.

BACKGROUND OF THE PRESENT DISCLOSURE

Field of the Present Disclosure

The present disclosure relates to a vehicle body structure capable of modular assembly, and more particularly, to a vehicle body structure configured for modular assembly in which assembled corner modules may be fastened to a chassis frame of a vehicle body.

Description of Related Art

A suspension system of a vehicle of the related art serves to connect the axle and the body of the vehicle to prevent vibration or shock received from the road surface from being transmitted directly to the vehicle body while the vehicle is being driven, preventing damage to the vehicle body or cargo and improving ride comfort. Such a suspension system includes a suspension spring to reduce shock received from the road surface, a shock absorber to improve the ride comfort by suppressing free vibration of the suspension spring, a stabilizer to suppress the rolling of the vehicle, and the like.

As a suspension system of a commercial vehicle, an integral type suspension system in which the left and right wheels are connected using a single axle is mainly used, and leaf springs or air springs are mainly used as suspension springs.

Furthermore, a steering system of a commercial vehicle using the integral type suspension system includes a Pitman arm mounted on an output shaft of a steering gear to be rotatable, a drag link to transfer the movement of the Pitman arm to knuckle arms, the knuckle arms configured to control a knuckle spindle by receiving the movement of the drag link, a tie rod connecting the left and right knuckle arms, and the like.

In a vehicle provided with an integral axle suspension system using an air spring and a steering system, the air spring only serves to substitute for a leaf spring and does not significantly contribute to improving ride comfort and handling characteristics. Due to structural characteristics of the air spring, it is difficult to obtain freedom of design to realize a precise geometry.

Furthermore, recently, independent steering suspension systems are being developed in which the steering angle of a wheel is input to each steering suspension system through a motor assembly are being developed. Respective corner modules may be fastened to a standardized body frame.

However, there is a problem in that the corner modules of the related art reduce a large portion of the internal spaces of front and rear wheels, because the shock absorber of each corner module is upright. Accordingly, corner modules capable of easy assembly and having a low-floor suspension structure are required.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle body structure configured for modular assembly to a chassis frame configured for a low-floor structure.

Also provided is a vehicle body structure configured for modular assembly and configured to respond to a torsional strength applied in the front and back direction of a vehicle by a module bracket to which an elastic member and a shock absorber are fastened.

The objectives of the present disclosure are not limited to the aforementioned description, and other objectives and advantages of the present disclosure not explicitly described will be understood from the description provided hereinafter, and from embodiments the present disclosure. Furthermore, objectives of the present disclosure may be realized by elements described in the claims and combinations thereof.

To achieve at least one of the above objectives, according to one aspect of the present disclosure, a vehicle body structure configured for modular assembly includes the following configurations.

According to an exemplary embodiment of the present disclosure, a vehicle body structure configured for modular assembly may include: a body frame forming a vehicle body: a chassis frame extending from the body frame; and a corner module fastened to a side portion of the chassis frame. The corner module may include: a knuckle fastened to a wheel: an upper arm positioned between a top end portion of the knuckle and a module bracket mounted on the chassis frame; and an elastic member mounted between the module bracket and a bottom end portion of the knuckle.

The vehicle body structure may further include a shock absorber including a first end portion coupled to the upper arm and a second end portion fastened to an elastic bracket located on the elastic member which the module bracket overlaps.

The vehicle body structure may further include a bush portion located between the elastic member and the elastic bracket.

The bush portion may include: one or more fixing holes extending through the elastic member, the elastic bracket, and the module bracket: one or more fixing members inserted into the one or more fixing holes, respectively, to integrally fix the elastic member, the elastic bracket, and the module bracket; and a high-strength bush area located between the elastic bracket and the elastic member and around at least one fixing hole among the one or more fixing holes.

The elastic member may be configured to be deformed with respect to the high-strength bush area in response to a torsional strength applied to the elastic member.

The vehicle body structure may further include an upper bracket mounted on the upper arm to which the shock absorber is fastened.

The elastic member may be configured so that a width thereof decreases and a thickness thereof increases as being more distant from the module bracket.

The elastic member may be formed of a carbon-fiber-reinforced polymer (CFRP) material.

The elastic member may extend at an angle at which the module bracket is provided to be fastened to the bottom end portion of the knuckle.

The vehicle body structure may further include a steering driving portion mounted on the chassis frame to be fastened to the knuckle.

The module bracket may include: a fixed bracket fastened to the chassis frame; and a pivotable bracket including a first end portion pivotably fastened to the fixed bracket and a second end portion fastened to the elastic member.

According to another exemplary embodiment of the present disclosure, a vehicle body structure configured for modular assembly may include: a body frame forming a vehicle body: a chassis frame extending from the body frame; and a corner module fastened to a side portion of the chassis frame. The corner module may include: a knuckle fastened to a wheel: an upper arm positioned between a top end portion of the knuckle and a module bracket mounted on the chassis frame: an elastic member mounted between the module bracket and a bottom end portion of the knuckle; and a shock absorber including a first end portion coupled to the upper arm and a second end portion fastened to an elastic bracket located on the elastic member which the module bracket overlaps.

The vehicle body structure may further include a bush portion located between the elastic member and the elastic bracket.

The bush portion may include: one or more fixing holes extending through the elastic member, the elastic bracket, and the module bracket: one or more fixing members inserted into the one or more fixing holes, respectively, to integrally fix the elastic member, the elastic bracket, and the module bracket; and a high-strength bush area located between the elastic bracket and the elastic member and around at least one fixing hole among the one or more fixing holes.

The elastic member may be configured to be deformed with respect to the high-strength bush area in response to a torsional strength applied to the elastic member.

The vehicle body structure may further include an upper bracket mounted on the upper arm to which the shock absorber is fastened.

The elastic member may be configured so that a width thereof decreases and a thickness thereof increases as being more distant from the module bracket.

The elastic member may be formed of a CFRP material.

The elastic member may extend at an angle at which the module bracket is provided to be fastened to the bottom end portion of the knuckle.

The module bracket may include: a fixed bracket fastened to the chassis frame; and a pivotable bracket including a first end portion pivotably fastened to the fixed bracket and a second end portion fastened to the elastic member.

According to an exemplary embodiment of the present disclosure, it is possible to obtain the following effects from embodiments and configurations described above and to be described below, as well as combinations and use relations thereof.

The vehicle body structure configured for modular assembly may minimize a vehicle fabrication process.

Furthermore, the vehicle body structure configured for modular assembly and including a low-floor structure may be provided without reducing the internal space of a vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
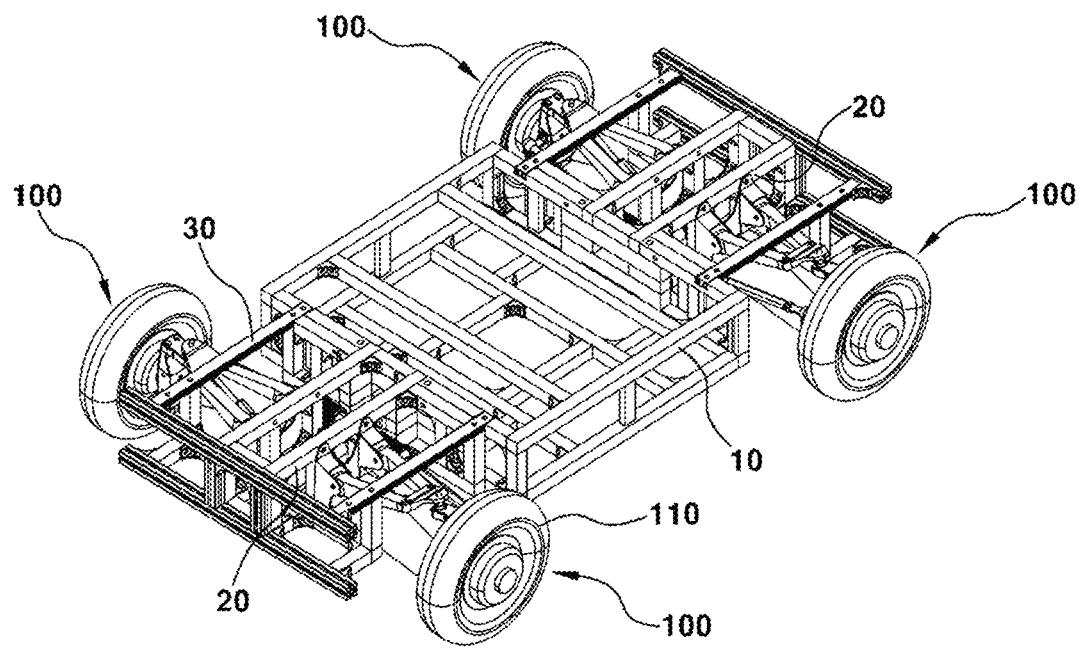
FIG. 1 illustrates a vehicle structure including a vehicle body structure configured for module assembly according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in more detail with reference to the accompanying drawings. The exemplary embodiments of the present disclosure may be variously modified in forms, and the scope of the present disclosure should not be construed as being limited to the exemplary embodiments described below. The exemplary embodiments are provided to more fully illustrate the present disclosure to those skilled in the art.

Furthermore, terms, such as "~ knuckle 120", "~ unit", "~ part", and "~ frame", refer to elements respectively performing at least one function or operation. The "~ knuckle", "~ unit", "~ part", "~ frame", or the like may be implemented as software, hardware, or a combination thereof.

Hereinafter, various exemplary embodiments of the present disclosure will be described in detail with reference to the accompanying drawings, in which identical or similar constituent elements are provided the same reference numerals regardless of the reference numerals of the drawings, and a repeated description thereof will be omitted.

The present disclosure relates to a corner module 100 configured for module assembly. A multi-wheeled vehicle may include independent corner modules 100 coupled to the vehicle body. Each of the independent corner modules 100 may have a steering angle 90° in the transverse direction, i.e., the right and left direction. The corner modules 100 according to an exemplary embodiment of the present disclosure may be coupled to each other before being fixed to a body frame 10 or chassis frames 20.

FIG. 1 illustrates a frame structure of a vehicle including the corner modules 100 configured for module assembly.

The frame structure of the vehicle includes the body frame 10 forming the lower portion of the vehicle. The body frame 10 includes a frame structure defining a rear surface of a passenger space or a loading space of the vehicle. The chassis frames 20 are provided on the front part and the rear part (or the front or rear part) of the body frame 10.

Here, the body frame 10 forms a lower portion of the vehicle. Various pieces of equipment required for operating the vehicle are provided on the body frame 10 to be coupled to each other. A space for accommodating passengers or luggage is also included.

Furthermore, whether or not to fasten the chassis frames 20 to the body frame 10 is determined depending on the size of the vehicle. When the body frame 10 is used for a small vehicle, the chassis frames 20 may be selectively fastened to the body frame 10 due to the small size of the vehicle. The lengths of the chassis frames 20 of the small vehicle may be shorter than those of other vehicles. In an exemplary embodiment of the present disclosure, the chassis frames 20 may be fastened to the body frame 10 to be located at the front and rear end portions of the body frame 10 by varying the lengths of the chassis frames 20. Thus, the present configuration may be applied to fabrication of vehicles including a variety of lengths.

Two or more chassis frames 20 may be fastened to the body frame 10 to be symmetrical in the front and back direction (or longitudinal direction) or the transverse direction of the body frame 10. The chassis frames 20 are fixed to the body frame 10 by welding or bolt fastening. The chassis frames 20 include frames fastened to the body frame 10 to include a smaller area than side surfaces of the body frame 10 to which the chassis frames 20 are fastened. The frames extend to the side surfaces of the body frame 10 to provide strength to the side surfaces of the body frame 10.

The corner modules 100 configured for module assembly may be fastened to both side surfaces of the chassis frames 20. The corner modules 100 are configured to be fastened to module brackets 200 fixed to the chassis frames 20. The corner modules are configured to be fastened to the chassis frames 20 through the module brackets 200 after the chassis frames 20 are fixed to the body frame 10. The module brackets 200 are fixed to the chassis frames 20 by welding or bolt fastening.

The vehicle body structure further includes bumper frames 30 fastened to the body frame 10 while being spaced from the top surfaces of the corner modules 100. The bumper frames 30 are provided on distal end portions of the chassis frames 20 to extend in the transverse direction of the vehicle, and are fixed to the body frame 10 while being spaced from the top surfaces of the corner modules 100. Due to the present configuration, shock applied to the bumper frames 30 may be transferred to the chassis frames 20 and the body frame 10.

Figure 2:
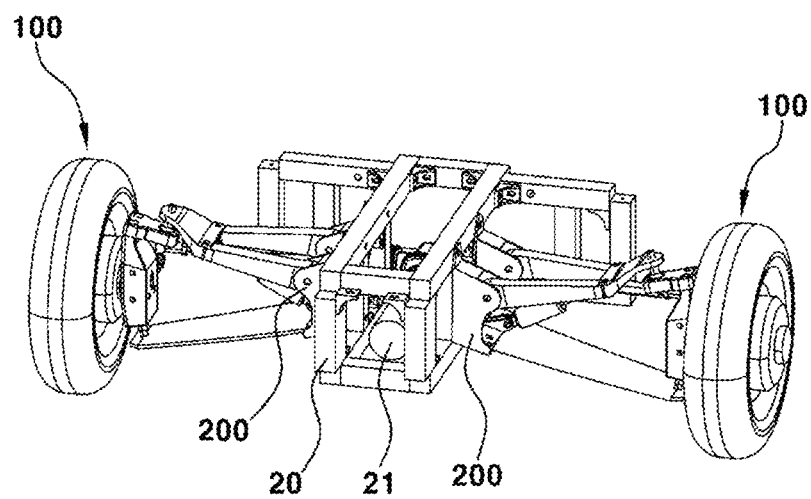
FIG. 2 illustrates a mounted structure of corner modules and a chassis frame fastened to the front part of the body frame.
Figure 3:
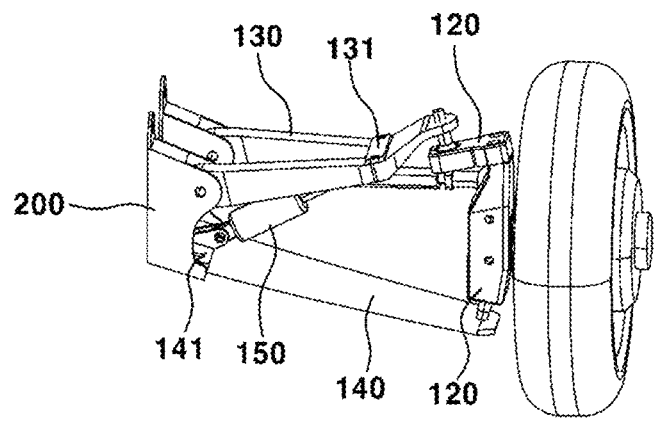
FIG. 3 illustrates a corner module fastened to a side surface of the chassis frame.

FIG. 2 illustrates an assembled state of corner modules 100 to be fastened to a chassis frame 20, and FIG. 3 is a side view of a corner module 100.

The module brackets 200 are located on both side surfaces of the chassis frames 20, and the corner modules 100 are fastened to the module brackets 200. Each of the corner modules 100 includes a wheel 110 including an in-wheel motor and a knuckle 120 configured to steer the wheel 110. Each of the corner modules 100 also includes an upper arm 130 located between the top end portion of the knuckle 120 and the corresponding module bracket 200 and an elastic member 140 to which the bottom end portion of the knuckle 120 and the bottom end portion of the module bracket 200 are fastened. Furthermore, each of the corner modules 100 includes a shock absorber 150 with one end portion being located on the top surface of the elastic member 140 in an area in which the elastic member 140 and the module bracket 200 overlap and the other end portion being fastened to the upper arm 130 located adjacent to the knuckle 120.

In an exemplary embodiment of the present disclosure, the upper arm 130 includes an upper bracket 131 configured to be fastened to the shock absorber 150 located on the upper arm 130. The upper bracket 131 is located on the top surface of the upper arm 130, and is configured so that the bottom surface of the upper bracket 131 is fastened to the shock absorber 150. Furthermore, the upper bracket 131 is located on the bottom end portion of the bumper frame 30 and is configured to absorb shock generated when the upper arm 130 is in contact with the bumper frame 30 in response to the bumping of the wheel 110.

Furthermore, each of the corner modules 100 includes an elastic bracket 141 located on the elastic member 140 and fastened to the shock absorber 150. The elastic bracket 141 is located in the area in which the corresponding module bracket 200 and the elastic member 140 overlap, and has fixing holes 161 corresponding to the elastic bracket 141, the module bracket 200, and the elastic member 140.

The elastic member 140 located between the module bracket 200 and the bottom end portion of the knuckle 120 may be formed of a carbon-fiber-reinforced polymer (CFRP) material. The elastic member 140 may include the shape of a cylinder or a trapezoid, the thickness of which varies depending on the longitudinal direction thereof. The elastic member 140 is configured to move up and down integrally with the knuckle 120 with respect to the module bracket 200 in response to the upward and downward movement of the knuckle 120 in response to the bumping rebound of the wheel 110.

The shock absorber 150 is configured so that one end portion thereof is located on the top surface of the elastic member 140 and the other end portion thereof is located on the upper arm 130. The other end portion of the shock absorber 150 is fastened to the upper bracket 131 located on the upper arm 130. The shock absorber 150 is configured to extend outwardly from the vehicle to include a predetermined angle from the module bracket 200 and to work in concert with the elastic member 140 to absorb upward and downward shock applied to the wheel 110.

A steering driving portion 21 is located on each of the chassis frames 20. The steering driving portion 21 may include a steering rack 22 extending in the transverse direction of the chassis frame 20. The steering rack 22 may be fastened to the knuckles 120 of the corner modules 100 to enable steering input so that each of the knuckles 120 pivots between the upper arm 130 and the elastic member 140.

In an exemplary embodiment of the present disclosure, the steering driving portion 21 may drive the steering rack to move using rotating force of a single independent motor located on the chassis frame. In another exemplary embodiment of the present disclosure, the steering driving portion 21 may include actuators located on the steering rack extending in the transverse direction of the chassis frame 20 to be fastened to the knuckles 120 to independently perform steering inputs of the knuckles 120 located on both sides of the chassis frame 20.

The corner modules 100 configured for module assembly and the bumper frames 30 according to an exemplary embodiment of the present disclosure may be fitted together with the chassis frames 20 in advance. Afterwards, the chassis frames 20 each including the corner modules 100 and the bumper frame 30 may be fitted to the body frame 10, completing a vehicle body.

That is, as illustrated in FIG. 2, the corner modules 100 may be fastened to the chassis frame 20 in advance. Afterwards, the chassis frame 20 including the corner modules 100 may be fastened to the body frame 10, forming the frame structure of the vehicle.

FIG. 4A, FIG. 4B, FIG. 4C, and FIG. 4D illustrate configurations of fixing holes 161 and a bush portion 160, to which a module bracket 200, an elastic member 140, and a shock absorber 150 are fastened, according to various embodiments of the present disclosure.

The elastic bracket 141 is provided on the top surface of the elastic member 140 to be fastened to one end portion of the shock absorber 150, and the bush portion 160 is provided between the elastic bracket 141 and the elastic member 140. Furthermore, the fixing holes 161 may be provided in corresponding positions of the bush portion 160, the elastic member 140, the shock absorber 150, and the module bracket 200. Fixing members 162 are fitted into the fixing holes 161 to integrally fasten the bush portion 160, the elastic member 140, the shock absorber 150, and the module bracket 200.

Furthermore, in an exemplary embodiment of the present disclosure, the elastic member 140 may include the shape of a plate, and thus may include a structure including a difficulty in absorbing the fore-and-aft torsion of one end portion thereof fastened to the module bracket 200. Thus, the bush portion 160 is configured to allow minute movement of the elastic member 140 in the longitudinal direction about at least one fixing hole 161 in response to the fore-and-aft torsion of the elastic member 140.

In an exemplary embodiment of the present disclosure, the bush portion 160 may include the one or more fixing holes 161 extending through the elastic member 140, the shock absorber 150, and the module bracket 200 and the fixing members 162 fitted into the fixing holes 161 to integrally fixing the elastic member 140, the shock absorber 150, and the module bracket 200. Furthermore, the bush portion 160 includes a high-strength bush area 163 located between the elastic bracket 141 and the elastic member 140 and around at least one of the fixing holes 161, and is configured to allow deformation in the front and back direction to the elastic member 140.

Furthermore, the entire area of the bush portion 160 except for the high-strength bush area 163 may be a low-strength bush area. In response to the fore-and-aft torsion, the elastic member 140 may be minutely moved integrally with the low-strength bush area with respect to the high-strength bush area 163.

That is, the bush portion 160 according to an exemplary embodiment of the present disclosure is configured so that the elastic member 140 may move minutely in response to force applied in the front and back direction with respect to the high-strength bush area 163.

Here, the high-strength area refers to an area of the bush area of the bush portion including a relatively high strength. That is, as a major component, the high-strength area refers to an area of the bush portion including a relatively high strength.

Figure 4A:
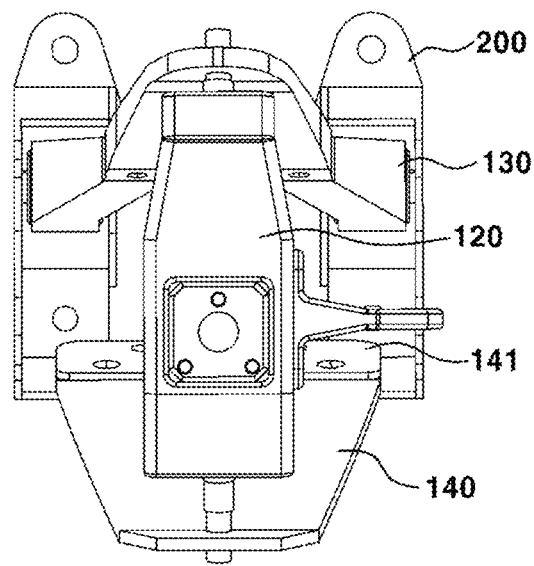
FIG. 4A illustrates a coupling relationship of a module bracket fastened to the chassis frame according to an exemplary embodiment of the present disclosure.
Figure 4B:
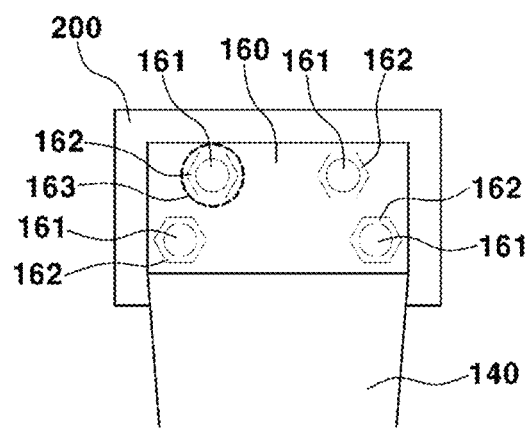
FIG. 4B illustrates a configuration of the bush portion located on the module bracket according to an exemplary embodiment of the present disclosure.

FIG. 4B illustrates a bush portion 160 including four fixing holes 161. The bush portion 160 includes the high-strength bush area 163 formed in an area corresponding to the upper left fixing hole 161 of the fixing holes 161 in the figure.

Figure 4C:
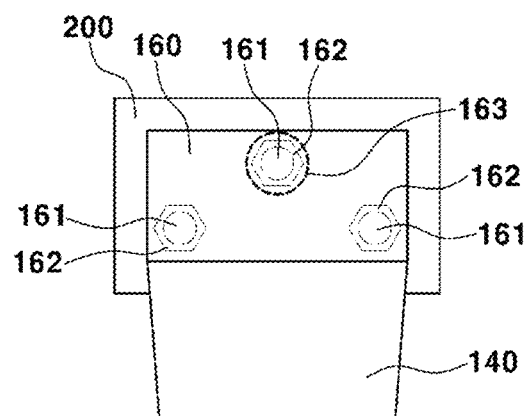
FIG. 4C illustrates a coupling relationship of the module bracket coupled to the chassis frame according to another exemplary embodiment of the present disclosure.

In comparison, FIG. 4C illustrates a bush portion 160 including three fixing holes 161. The bush portion 160 includes the high-strength bush area 163 formed in an area corresponding to the upper fixing hole 161 of the fixing holes 161 in the figure.

Figure 4D:
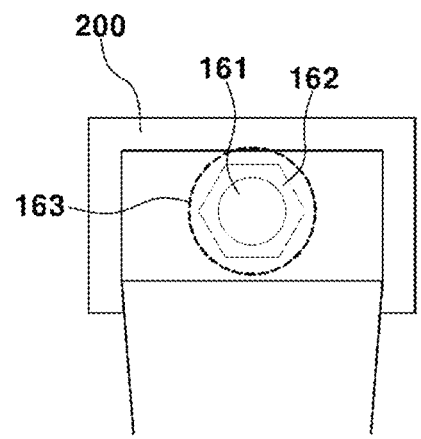
FIG. 4D illustrates a coupling relationship of the module bracket coupled to the chassis frame according to another exemplary embodiment of the present disclosure.

Furthermore, FIG. 4D illustrates a bush portion 160 including a single fixing hole 161 with a high-strength bush area 163 being formed in an area in which the fixing hole 161 is located.

As disclosed above, the high-strength bush area 163 may be provided in at least one fixing hole 161 of the fixing holes 161 and configured to allow minute movement in the front and back direction to the elastic member 140 with respect to the high-strength bush area 163.

Figure 5:
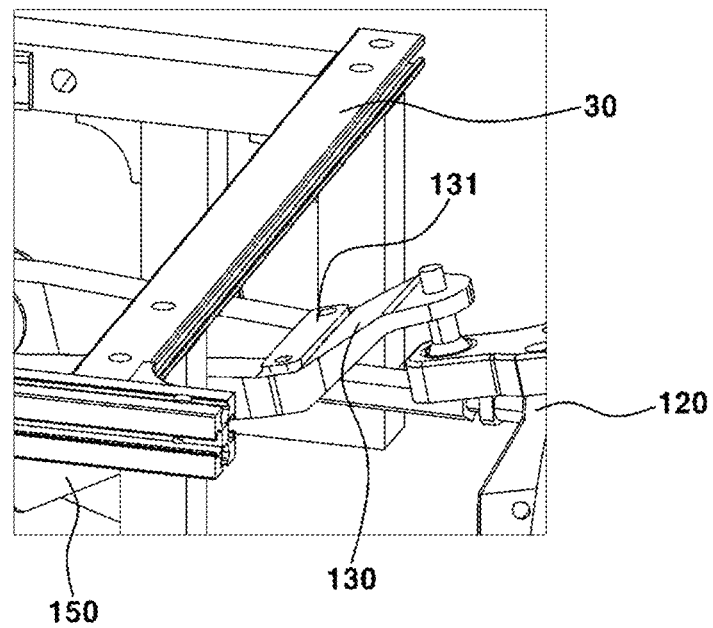
FIG. 5 illustrates a coupling relationship of the upper bracket according to an exemplary embodiment of the present disclosure.

FIG. 5 illustrates the upper bracket 131 located adjacent to the bumper frame 30 according to an exemplary embodiment of the present disclosure.

One end portion of the shock absorber 150 fastened to the upper arm 130 is fastened to the bottom end portion of the upper bracket 131 fastened to the top surface of the upper arm 130. The upper bracket 131 is configured to surround at least a portion of the top surface of the upper arm 130, and is located adjacent to the bumper frame 30 at the bottom end portion of the bumper frame 30. Thus, when the upper arm 130 is pivoted in the upward-downward direction with respect to the module bracket 200 to come into contact with the bumper frame 30 spaced from the top surface of the corner module 100, the upper bracket 131 is located between the bumper frame 30 and the upper arm 130 to serve as a stopper. That is, the upper bracket 131 is located between the bumper frame 30 and the upper arm 130 to absorb shock occurring between the bumper frame 30 and the upper arm 130 in response to the upward and downward movement of the upper arm 130.

One end portion of the shock absorber 150 is fastened to the bottom surface of the upper bracket 131. Thus, the length of the shock absorber 150 varies in response to the upward and downward movement of the upper arm 130, and the shock absorber 150 provides reaction force in response to the pivoting of the upper arm 130.

The upper arm 130 and the knuckle 120 are fastened by a rotary joint, and the bottom end portion of the knuckle 120 is fastened to the elastic member 140 by a rotary joint. The knuckle 120 is configured to pivot based on the upper arm 130 fastened to the top end portion thereof and the elastic member 140 fastened to the bottom end portion thereof.

Figure 6:
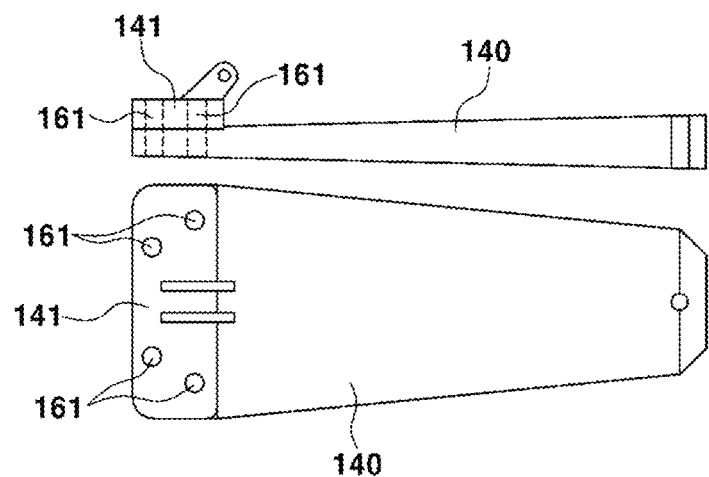
FIG. 6 illustrates a configuration of the elastic member including a planar shape according to an exemplary embodiment of the present disclosure.

FIG. 6 illustrates a configuration of the elastic member 140 according to an exemplary embodiment of the present disclosure.

The elastic member 140 may be formed of a carbon fiber-reinforced plastic (CFRP) material to include the shape of a plate. The elastic member 140 may be configured so that a width thereof decreases as being more distant from the chassis frame 20. Furthermore, the elastic member 140 may be configured so that the thickness thereof increases as being more distant from the chassis frame 20. That is, because the elastic member 140 is configured so that the thickness thereof increases as a width thereof decreases, the performance of elasticity of the elastic member 140 according to the position may be maintained constantly.

In another exemplary embodiment of the present disclosure, the elastic member 140 may include a variety of shapes such as a cylindrical cross-sectional shape or a square cross-sectional shape.

Furthermore, the elastic member 140 is configured to be located linearly at an angle defined between the module bracket 200 and the chassis frame 20 in an unloaded state. That is, the elastic member 140 includes a downwardly-bent shape before being mounted on the corner module 100. The elastic member 140 may be set to be parallel to the angle defined between the module bracket 200 and the chassis frame 20 according to the unloaded weight of the vehicle in a state in which the corner module 100 is mounted.

The corner module 100 including the elastic member 140 includes a coupling relationship extending to and located on the bottom end portion of the knuckle 120 in a direction parallel to the angle defined between the module bracket 200 and the chassis frame 20 in the unloaded state.

Furthermore, in the bump state of the wheel 110, the elastic member 140 is moved upward integrally with the knuckle 120 in response to the upward movement of the knuckle 120. One end portion of the elastic member 140 fastened to the knuckle 120 is converted into a bent state by the upward movement. That is, the elastic member 140 is configured to restore the wheel 110 by providing reaction force in a direction opposite to the direction of the upward-downward movement of the wheel 110 in response to the upward-downward movement of the wheel 110.

Furthermore, one end portion of the shock absorber 150 fastened to the elastic bracket 141 may be located at a position of one of both distal end portions of the elastic bracket 141 in the width direction, i.e., at the center portion of the elastic bracket 141.

For example, when one end portion of the shock absorber 150 fastened to the elastic bracket 141 is located in front of the vehicle, shock may be absorbed at the occurrence of not only the upward-downward movement but also the forward-backward movement applied to the corner module 100.

Figure 7A:
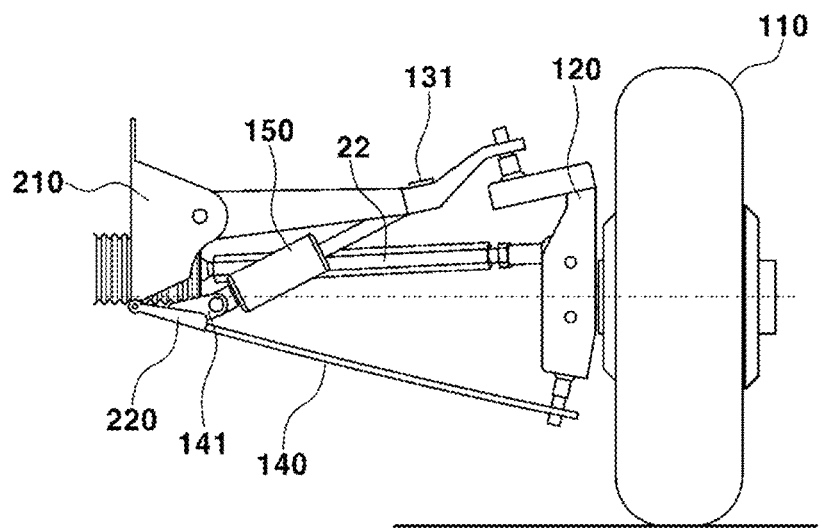
FIG. 7A illustrates an unloaded state of the vehicle body structure configured for module assembly according to an exemplary embodiment of the present disclosure.
Figure 7B:
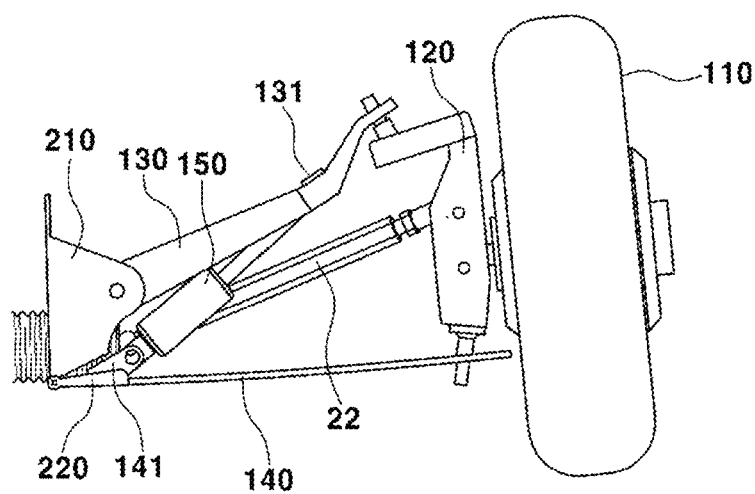
FIG. 7B illustrates a bump state of the vehicle body structure configured for module assembly according to an exemplary embodiment of the present disclosure.

FIG. 7A and FIG. 7B illustrate a driving relationship of a fixed bracket 210 and a pivotable bracket 220 of the module bracket 200 according to another exemplary embodiment of the present disclosure.

The module bracket 200 according to an exemplary embodiment of the present disclosure includes the fixed bracket 210 fastened to the chassis frame 20 and the pivotable bracket 220 pivotably fastened to the fixed bracket 210. The pivotable bracket 220 is configured to pivot with the other end portion thereof fastened to the elastic member 140.

In the unloaded state of the vehicle, as illustrated in FIG. 7A, the elastic member 140 is fastened to the pivotable bracket 220 in a state parallel to an angle defined between the pivotable bracket 220 and the fixed bracket 210.

In comparison, in the bump state of the wheel 110, as illustrated in FIG. 7B, the pivotable bracket 220 pivots with respect to the fixed bracket 210. The elastic member 140 and the pivotable bracket 220 integrally pivot and move, and the elastic member 140 is additionally configured so that the other end portion thereof bends with respect to the pivotable bracket 220 in response to the upward movement of the knuckle 120. Furthermore, the elastic bracket 141 is located on the pivotable bracket 220 and is configured to absorb shock in the bump state of the wheel 110.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle body structure configured for modular assembly, the vehicle body structure comprising:
   a body frame forming a vehicle body;
   a chassis frame extending from the body frame; and a corner module fastened to a side portion of the chassis frame, wherein the corner module includes:
- a knuckle fastened to a wheel;
- an upper arm positioned between a top end portion of the knuckle and a module bracket mounted on the chassis frame; and
- an elastic member fastened between the module bracket and a bottom end portion of the knuckle.

2. The vehicle body structure of claim 1, further including a shock absorber including a first end portion coupled to the upper arm and a second end portion fastened to an elastic bracket located on the elastic member which the module bracket overlaps.

3. The vehicle body structure of claim 2, further including a bush portion located between the elastic member and the elastic bracket.

4. The vehicle body structure of claim 3, wherein the bush portion includes:
- one or more fixing holes extending through the elastic member, the elastic bracket, and the module bracket;
- one or more fixing members inserted into the one or more fixing holes, respectively, to integrally fix the elastic member, the elastic bracket, and the module bracket; and
- a high-strength bush area located between the elastic bracket and the elastic member and around at least one fixing hole among the one or more fixing holes.

5. The vehicle body structure of claim 4, wherein the elastic member is configured to be deformed with respect to the high-strength bush area in response to a torsional strength applied to the elastic member.

6. The vehicle body structure of claim 2, further including an upper bracket mounted on the upper arm to which the shock absorber is fastened.

7. The vehicle body structure of claim 1, wherein the elastic member is configured so that a width thereof decreases and a thickness thereof increases as being more distant from the module bracket.

8. The vehicle body structure of claim 1, wherein the elastic member is formed of a carbon-fiber-reinforced polymer material.

9. The vehicle body structure of claim 1, wherein the elastic member extends at an angle at which the module bracket is provided to be fastened to the bottom end portion of the knuckle.

10. The vehicle body structure of claim 1, further including a steering driving portion mounted on the chassis frame to be fastened to the knuckle.

11. The vehicle body structure of claim 1, wherein the module bracket includes:
- a fixed bracket fastened to the chassis frame; and
- a pivotable bracket including a first end portion pivotably fastened to the fixed bracket and a second end portion fastened to the elastic member.

12. A vehicle body structure configured for modular assembly, the vehicle body structure comprising:
- a body frame forming a vehicle body;
- a chassis frame extending from the body frame; and
- a corner module fastened to a side portion of the chassis frame, wherein the corner module includes:
- a knuckle fastened to a wheel;
- an upper arm positioned between a top end portion of the knuckle and a module bracket mounted on the chassis frame;
- an elastic member fastened between the module bracket and a bottom end portion of the knuckle; and
- a shock absorber including a first end portion coupled to the upper arm and a second end portion fastened to an elastic bracket located on the elastic member which the module bracket overlaps.

13. The vehicle body structure of claim 12, further including a bush portion located between the elastic member and the elastic bracket.

14. The vehicle body structure of claim 13, wherein the bush portion includes:
- one or more fixing holes extending through the elastic member, the elastic bracket, and the module bracket;
- one or more fixing members inserted into the one or more fixing holes, respectively, to integrally fix the elastic member, the elastic bracket, and the module bracket; and
- a high-strength bush area located between the elastic bracket and the elastic member and around at least one fixing hole among the one or more fixing holes.

15. The vehicle body structure of claim 14, wherein the elastic member is configured to be deformed with respect to the high-strength bush area in response to a torsional strength applied to the elastic member.

16. The vehicle body structure of claim 12, further including an upper bracket mounted on the upper arm to which the shock absorber is fastened.

17. The vehicle body structure of claim 12, wherein the elastic member is configured so that a width thereof decreases and a thickness thereof increases as being more distant from the module bracket.

18. The vehicle body structure of claim 12, wherein the elastic member is formed of a carbon-fiber-reinforced polymer material.

19. The vehicle body structure of claim 12, wherein the elastic member extends at an angle at which the module bracket is provided to be fastened to the bottom end portion of the knuckle.

20. The vehicle body structure of claim 12, wherein the module bracket includes:
- a fixed bracket fastened to the chassis frame; and
- a pivotable bracket including a first end portion pivotably fastened to the fixed bracket and a second end portion fastened to the elastic member.

* * * * *